No. 620,964. Patented Mar. 14, 1899.
A. C. RICE.
TURBINE.
(Application filed May 9, 1898.)
(No Model.)

WITNESSES:
John W. Kallfurd
W. F. Woss.

A. C. Rice
INVENTOR
BY R. J. McCarty
ATTORNEY.

UNITED STATES PATENT OFFICE.

ALVA C. RICE, OF DAYTON, OHIO.

TURBINE.

SPECIFICATION forming part of Letters Patent No. 620,964, dated March 14, 1899.

Application filed May 9, 1898. Serial No. 680,156. (No model.)

*To all whom it may concern:*

Be it known that I, ALVA C. RICE, a citizen of the United States, residing at Dayton, in the county of Montgomery and State of Ohio, have invented certain new and useful Improvements in Turbines; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to that class of turbine wheels in which is contemplated the mounting of two or more wheels upon a horizontal shaft and so arranging them that they discharge into one draft-tube.

The object of the said invention is to so construct and connect the draft-chamber casing, the chute-cases, and the cylinders with the flume-heads that a perfect alinement of the chute-cases with the water-wheels is insured and to relieve the shaft of all strain or pressure except that which is due to the action of the water.

A further object of the invention is to so construct and locate the bearings for the wheel-shaft that a perfect alinement thereof is maintained.

A further object of the invention is to so arrange the several parts constituting the wheel-casing that the gate-rings and wheels will be easily accessible; and a still further object of the said invention is to provide and locate on the outside of the flume-head mechanism for operating the gates where it is easily accessible and may be gotten at for repairs without interfering with the other parts of the wheel.

In the specification to follow similar letters of reference will indicate corresponding parts in the several views of the drawings.

Figure 1:
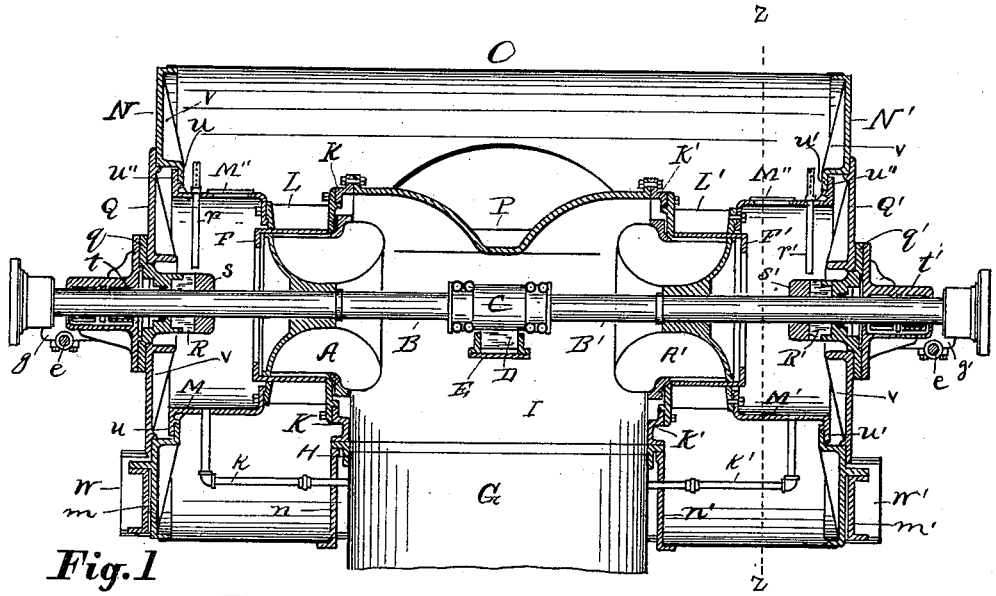
Figures 2, 3:
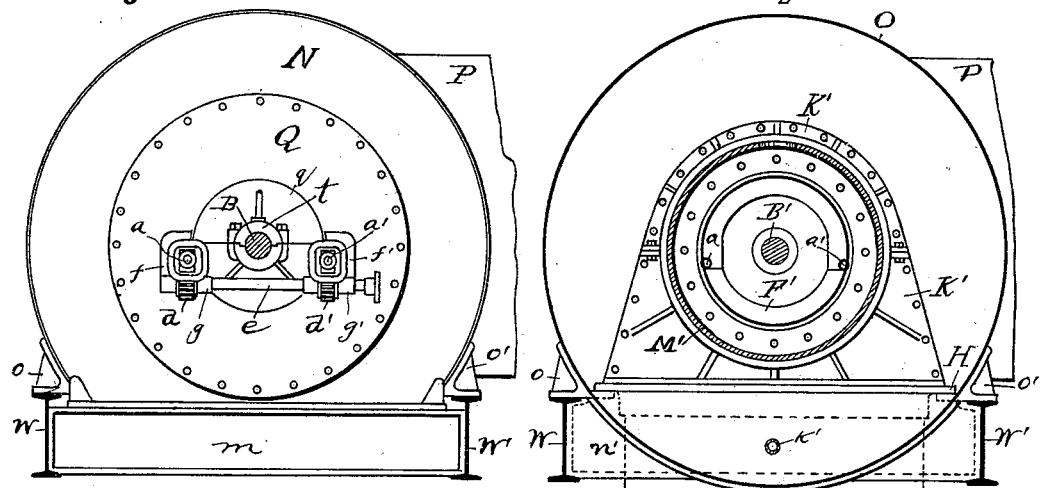
Figure 4:
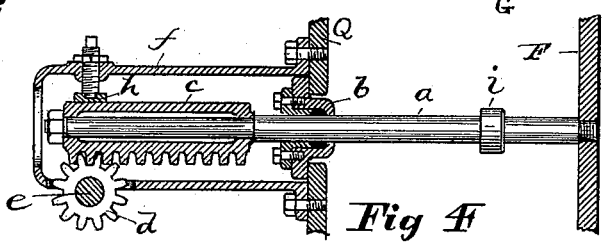

Referring to said drawings, Figure 1 is a vertical longitudinal section of the water-wheel mechanism constructed in accordance with my invention. Fig. 2 is an end elevation of Fig. 1. Fig. 3 is a cross-section on the line $z\ z$ of Fig. 1. Fig. 4 is an enlarged detail sectional view of the gate-operating mechanism.

The turbine wheels A A' are mounted on a shaft consisting of two sections B B', united midway between the wheels by a sleeve-coupling C. The latter coupling also forms a journal that runs in a bearing D, inclosed in a casing E, which is rigidly secured to the draft-chamber casing I, midway between the wheels. This coupling C and bearing D are embodied in my pending application, Serial No. 680,155. The latter casing is rigidly secured to a ring H, to which the draft-tube G is also secured, the said ring H being bolted to tie-plates $n\ n'$.

K K' are rings or rounded plates, to which the draft-chamber casing I and the chute-cases L L' are rigidly attached, and M M' designate dome-cylinders rigidly attached to said chute-cases and provided with manholes and covers M''. The outer ends of said cylinders are connected with the flume-heads N N'. The portions of the said flume-heads around the openings therein are projected inwardly and form annular flanges $u\ u'$, against the outer sides of which similar flanges $u''\ u''$ on the dome-cylinders abut. This manner of constructing the flume-heads is very desirable, as it enables the heads to be suitably strengthened by placing the ribs $v$ on the insides thereof, and thus the exterior sides of said heads are given a neat appearance.

From the above description it will be seen that the end cylinders M and M' are sustained by rigid connection with the flume-heads. These heads are of suitable strength and construction to sustain this connection in a manner to insure the maintenance of a proper alinement of the entire system of casings and the wheel-shaft which has a central bearing in the draft-chamber casing I and the flume-head covers Q Q'. This distribution of the shaft-bearings makes it imperative that an accurate alinement of the casings and shaft be maintained.

The openings in the flume-heads are closed by covers Q Q', that lie flush with the outer surface of said heads. The flume O is provided with manhole and cover (not shown) and is supplied with water through feed-pipe P. The flume-head covers have bolted to them packing-boxes $q\ q'$, that are fitted with packing-glands and have their inner ends recessed to receive wood steps R R'. Secured to the outer surface of the packing-glands are ring oil-bearings $t\ t'$, made in halves.

The wheel-casing above described, it will be seen, is alike at both ends. Therefore it may be placed in a reversed position from that shown in the drawings for wheels running in an opposite direction. This structural feature is of considerable importance, as it increases or enlarges the utility of the casing and enables the observance of economical methods in shop work, to the end that the cost of production is considerably lessened.

The cylinder-gates F F' are operated by rods $a$ $a'$, one of which is connected to each side of each of said gates. These actuating-rods pass through packing-boxes $b$ in the flume-head covers and have on their outer ends racks $c$, that engage with pinions $d$ $d'$, keyed to transverse shafts $e$, which are operated by a hand-wheel or in any suitable manner. The racks and pinions are inclosed in housings $f$ $f'$, which are bolted to the flume-head covers. The said housings also provide bearings $g$ $g'$ for the shafts $e$ and support adjustable bearing-plates $h$, which preserve a proper alinement of said gate-rods. Each of the gate-rods $a$ $a'$ has a collar $i$, that acts as a stop to limit the movement of the gates to their full opening. The cylinders M M' are kept free from water and the oil-bearings protected by means of drain-pipes $k$ $k'$, which discharge from said cylinders into the draft-tube, the discharge of water from the wheels creating a suction that has the effect of drawing the water through said pipes. The thrust-bearings $s$ $s'$ are lubricated by means of pipes $r$ $r'$, that pass into the cylinders and discharge water directly onto the surface between the wood steps and the collars. The wheel complete, as shown in Fig. 1, is supported on I-beams $w$ $w'$, connected to tie-beams $m$ $m'$, and tie-plates $n$ $n'$, secured to the flume by brackets $o$ $o'$.

By the above-described construction the draft-chamber, chute-cases, and cylinders are all compactly inclosed by and connected to the flume-heads. The latter are suitably strengthened to insure a perfect alinement of the casing and the shaft, the bearings for said shaft being equally distributed between the heads and the center of said casing.

Having described my invention, I claim—

1. In a horizontal water-wheel having a central discharge, the combination with a flume-casing the heads of which project inwardly and terminate in openings surrounded by annular flanges, dome-cylinders M and M' rigidly sustained on said annular flanges, covers closing the openings in the flume-heads and lying flush with the outer surfaces of said flume-heads, chute-cases bolted to said dome-cylinders, and a central draft-chamber casing bolted to said chute-cases, the flume-heads thus forming rigid supports for the casings whereby said casings are maintained in a proper alinement, and bearings for the wheel-shaft in the flume-head covers and central draft-chamber, substantially as described.

2. In a horizontal water-wheel having a central discharge, the combination with a flume-casing a portion of the heads of which project in and form the openings therein, and covers closing said openings, of dome-cylinders connected to said inwardly-projected portions of said flume-heads, chute-cases, a central draft-chamber casing disposed between and connected to said chute-cases and communicating with the central discharge, water-wheels A and A' and the shaft thereof, the latter having bearings in the flume-head covers and in the draft-chamber casing, substantially as described.

3. In a horizontal water-wheel having a central discharge, the combination with a flume the heads of which are projected in and terminate in openings, covers closing said openings, dome-cylinders sustained on said inwardly-projected heads, chute-cases rigidly sustained on said dome-cylinders, a centrally-disposed draft-chamber casing rigidly supported on said chute-cases, cylinder-gates movable in and out of said chute-cases and dome-cylinders to regulate the admission of water to the wheels, actuating-rods connected to the sides of said gates and passing out through the flume-head covers, gearing supported on said flume-head covers for operating said rods, and means for preserving a proper alinement of said rods, substantially as described.

In testimony that I claim the foregoing as my own I hereto affix my signature in presence of two witnesses.

ALVA C. RICE.

Witnesses:
FRANK W. HOWELL,
R. J. MCCARTY.